(12) United States Patent
Wesian (10) Patent No.: US 9,012,861 B2
(45) Date of Patent: Apr. 21, 2015

(54) DEVICE AND METHOD FOR DETERMINING THE DEGREE OF DISINFECTION OF A LIQUID

(75) Inventor: Martin Wesian, Vienna (AT)

(73) Assignee: Helioz Research and Development GmbH, Vienna (AT)

( * ) Notice: Subject to any disclaimer, the term of this patent is extended or adjusted under 35 U.S.C. 154(b) by 225 days.

(21) Appl. No.: 13/581,328

(22) PCT Filed: Feb. 17, 2011

(86) PCT No.: PCT/AT2011/000083
§ 371 (c)(1),
(2), (4) Date: Aug. 27, 2012

(87) PCT Pub. No.: WO2011/106808
PCT Pub. Date: Sep. 9, 2011

(65) Prior Publication Data
US 2012/0318997 A1     Dec. 20, 2012

(30) Foreign Application Priority Data
Mar. 1, 2010   (AT) .................................. A 314/2010

(51) Int. Cl.
*G01J 1/42*       (2006.01)
*C02F 1/32*       (2006.01)

(52) U.S. Cl.
CPC .............. *C02F 1/32* (2013.01); *C02F 2201/009* (2013.01); *C02F 2201/326* (2013.01);
(Continued)

(58) Field of Classification Search
CPC .... C02F 1/32; C02F 2303/04; C02F 2307/04; C02F 2307/02; C02F 2209/02005; G01J 1/429

USPC ......................... 250/372; 210/748.1, 748.11
See application file for complete search history.

(56) References Cited

U.S. PATENT DOCUMENTS 3,650,201 A * 3/1972 Jovanovic ........................ 99/279
3,657,731 A * 4/1972 Krauer et al. .................. 324/441
(Continued)

OTHER PUBLICATIONS

International Search Report, PCT/AT2011/000083, Jun. 21, 2011.
(Continued)

*Primary Examiner* — Yara B Green
(74) *Attorney, Agent, or Firm* — Joseph E. Maenner; Maenner & Associates, LLC (57) ABSTRACT

The invention relates to a device and also a method for determining the degree of disinfection, and for determining the time point when a defined degree of disinfection is reached by a liquid, in particular drinking water, that is situated in a container which is light-permeable at least in a UV range. The device comprises in this case a UV measuring appliance for measuring the intensity of the UV radiation in the region of the container, a data analysis unit to which the values of the UV intensity which are measured by the UV measuring device are fed, and wherein the data analysis unit converts the UV intensity values measured at the start of a measurement at defined time points to form a characteristic, and wherein the data analysis unit compares the characteristics determined at defined time points with a predetermined characteristic, which predetermined characteristic corresponds to a defined degree of disinfection of the liquid, and wherein the device comprises at least one signal output appliance which, in the event that the determined characteristics reaches or exceeds the value of the predetermined characteristic, provides the signal output.

4 Claims, 4 Drawing Sheets

(52) U.S. Cl.
CPC ...... *C02F 2209/005* (2013.01); *C02F 2209/02* (2013.01); *C02F 2303/04* (2013.01); *C02F 2307/02* (2013.01); *C02F 2307/04* (2013.01); *G01J 1/429* (2013.01)

(56) References Cited

U.S. PATENT DOCUMENTS

| | | | | |
|---|---|---|---|---|
| 4,126,783 | A | * | 11/1978 | Lanza et al. ............... 250/336.2 |
| 5,725,757 | A | * | 3/1998 | Binot ............................. 210/85 |
| 8,044,363 | B2 | * | 10/2011 | Ales et al. .................... 250/372 |
| 2001/0048891 | A1 | | 12/2001 | McGeorge et al. |
| 2003/0075490 | A1 | | 4/2003 | Lifschitz |

OTHER PUBLICATIONS

DeJung et al., "Effect of Solar Water Disinfection (SODIS) on Model Microorganisms under Improved and Field SODIS Conditions" Journal of Water Supply: Research and Technology—Aqua. vol. 56, No. 4, 2007, pp. 245-256.

Weglin, M. et al. "Solar Water Disinfection: Scope of the Process and Analysis of Radiation Experiments" J. Water SRT, vol. 43, No. 3, Aug. 1994, pp. 154-169.

U.S. Environmental Protection Agency, "Final report: Enhanced Photocatalytic Solar Disinfection of Water as Effective Intervention Against Waterborne Diarrheal Diseases in Developing Countries", Oct. 30, 2009.

* cited by examiner

DEVICE AND METHOD FOR DETERMINING THE DEGREE OF DISINFECTION OF A LIQUID

CROSS REFERENCE TO RELATED APPLICATIONS

The present application is a U.S. National Stage Application of PCT Application Serial No. PCT/AT2011/000083, filed on Feb. 17, 2011, which claims priority from Austrian Patent application A 314/2010, filed on Mar. 12, 2010, both of which are incorporated by reference in their entireties.

FIELD OF THE INVENTION

The invention relates to a device for determining the degree of disinfection of a liquid, particularly drinking water, which is located inside a container that is transparent to at least one UV region.

The invention further relates to a method for determining the degree of disinfection of a liquid, particularly drinking water, which is located inside a container that is transparent to at least one UV region.

BACKGROUND OF THE INVENTION

Every day, 9,000 children and numerous adults die after consuming contaminated water. Over half of all hospital beds in impacted regions are filled by people suffering from diseases caused by water that is contaminated with bacteria. Natural disasters that occur every year prompt organizations like the "UN" and "Doctors Without Borders" to invest millions of Euros in short-term supplies of drinking water to impacted countries. In addition to the human suffering, the economic damage and the disadvantages to the entire healthcare system are enormous. The "United Nations" has acknowledged the problem and in response has declared its "Millennium Development Goals". As part of these goals, all member countries have pledged to provide one-half of the worldwide population suffering from a lack of clean drinking water with an adequate drinking water supply by the year 2015. This means that every year, 125 million people will have to be provided with a long-term and sustainable supply of water. The countries of the "UN" have provided 11.3 billion dollars per year to accomplish this goal. In order to put these funds to meaningful use, the "UN" and the organizations and countries involved with the project are seeking solutions in the field of drinking water disinfection that are cost-efficient and can be easily implemented.

Already established is "solar drinking water disinfection" (SODIS). SODIS was developed by ETH Zurich, and has been characterized by the "WHO" and the "UN" as the most efficient and cost-effective method of drinking water disinfection". Internationally, SODIS can already claim 3 million users; however, there are some disadvantages in its application and its acceptance. Currently, the recommended value for the solar disinfection of drinking water is 6 hours of direct sunlight and 12-18 hours under partly cloudy conditions. Naturally, these specifications are dependent upon various factors, such as the position of the sun, the degree of cloudiness, the temperature, shadowing, wind and precipitation, which complicate the estimation of the amount of sunlight that is required and impair confidence in the actual degree of disinfection. Due to the lack of control of the method, the water frequently is not exposed long enough to the sun, resulting in incomplete disinfection. This, in turn, results in the users becoming infected with dysentery, cholera, typhus, etc.

The problem addressed by the invention is that of devising a reliable and easily implemented option for detecting the disinfection of a liquid, particularly of drinking water.

BRIEF SUMMARY OF THE INVENTION

This problem is solved by a device described in the introductory part, which comprises:
 a UV measuring device for measuring the intensity of UV radiation, particularly the UV radiation from sunlight, in the region of the container,
 an analysis unit, to which the values for UV intensity, measured by the UV measuring device, are fed, and wherein
 the analysis unit converts the values for UV intensity, measured at defined points in time from the start of a measurement, to a characteristic value,
 and wherein the analysis unit compares the characteristic values calculated at defined points in time with a predetermined characteristic value, which predetermined characteristic value corresponds to a defined degree of disinfection of the liquid, and wherein
 the device comprises at least one signal output device which emits a signal when the calculated characteristic value reaches or exceeds the predetermined characteristic value.

The above-stated problem is further solved by a mentioned method, which comprises the following steps:
 measuring the intensity of the UV radiation in the region of the container,
 converting the values for UV intensity, measured at defined points in time from the start of a measurement, to a characteristic value,
 comparing the characteristic values calculated at defined points in time with a predetermined characteristic value, which predetermined characteristic value corresponds to a defined degree of disinfection of the liquid, and
 emitting a signal when the calculated characteristic value reaches or exceeds the predetermined characteristic value.

A commercially available PET bottle is filled with the contaminated water and is then placed in the sun. The UV radiation from the sun kills the bacteria in the water. Depending upon the degree of sunlight and/or cloudiness, the water is disinfected after approximately 1-3 days. Although this method, known as SODIS, is already being used by 3 million people worldwide, a number of problems stand in the way of its more widespread use. These problems include the large amount of training that is required, which is insurmountable for a large number of those affected, especially since retraining is necessary at regular intervals.

Additionally, the method is not widely accepted because it seems too simple and because the time at which the water is actually disinfected is not clearly controlled.

The present invention offers a possible solution in the form of a cost-effective and autonomous technical device which measures the optimal UV exposure time and indicates to users when the solar water disinfection cycle is completed. The device can be produced very cheaply, and will provide a family with an independent source of safe drinking water for many years.

It is particularly advantageous for the device to further comprise a temperature measuring device for determining the temperature of the liquid inside the container.

The determined temperature of the liquid inside the container can then be taken into consideration in calculating the characteristic value.

The factor of temperature can be a significant component in accelerating disinfection. At temperatures above 40° C., pathogens are killed off solely as a result of the temperature. Temperature disinfection is independent of UV radiation; however, in combination, these offer a guarantee of optimal disinfection.

A sufficient temperature can be achieved through simple technical means by using a dark or reflective surface, on which the water-filled PET bottles are placed for disinfection.

Temperature measurement is meaningful and/or expedient only when (sufficient) liquid is present, specifically, at least enough liquid that the temperature measuring device is also in contact with the liquid. It is therefore expedient for the temperature measuring device to be configured to detect the presence of liquid, and for the temperature to be measured only when liquid is present.

If the temperature measuring device is not in contact with the liquid, the temperature of the air in the container would otherwise be measured, which, in some circumstances, can be substantially higher than the temperature of the liquid. This would lead to a distorted result and particularly to a premature indication of the desired disinfection time point.

In one specific embodiment of the invention, it is provided that the UV measuring device comprises at least one UV sensor.

For the supply of power to the electrical components of the device, it can be provided that the device comprises one or more solar cells.

Power can also be supplied by way of a battery or preferably by a rechargeable battery, wherein the rechargeable battery can then be charged by means of the solar cells.

In one variant of the invention, the UV measuring device comprises one or more solar cells. A filter is situated upstream of the solar cell or cells and permits the passage only of light in the UV region, particularly only in the UV-A region, or in the preferred measurement spectrum. The UV intensity can then be deduced based upon the current supplied by the solar cells.

The use of solar cells can offer a substantially more advantageous solution than using a separate UV sensor. However, a combination of UV sensor and solar cells for the UV measuring device is also conceivable in principle.

To calculate the characteristic value $K(t)$, the values for UV intensity, measured per unit of time $\Delta t$, are totaled over the time t and/or the values for UV intensity, measured as a function of the time t, are integrated over time. In other words, in practical terms, the dose of UV radiation (e.g., in $Ws/m^2$) is measured and is continuously compared with a threshold value $K_o$, which threshold value defines a degree of disinfection at which the liquid (water) is potable.

To optimize the synergistic effects of UV radiation and the prevailing temperature of the liquid for disinfection and/or for determining the time of a specific degree of disinfection, the values for UV intensity measured per unit of time $\Delta t$ or as a function of time t are weighted, prior to totaling or integration, with the temperature $T(\Delta t)$ measured per unit of time $\Delta t$ or with the temperature $T(t)$ measured as a function of time t, respectively.

At each time t or each unit of time $\Delta t$ at which the UV intensity is measured, the temperature can actually be measured and taken into consideration. However, the temperature can also be measured at greater time intervals, since it generally does not vary as much as UV intensity.

In one easily implemented variant of the invention, the analysis unit comprises a counter or is a counter, the counter reading of which increases per unit of time $\Delta t$ by a counter value that is proportional to the value for UV intensity measured in said unit of time $\Delta t$, and the predetermined characteristic value corresponds to a defined value for the counter reading.

If the temperature is taken into consideration in this variant, the counter value is multiplied by a proportionality factor that is dependent on temperature, which proportionality factor takes on the value of 1 for a minimal temperature and for temperature values below the minimal temperature, and takes on a value greater than 1, dependent on the temperature, for temperature values above the minimal temperature.

To allow the device to be reliably arranged near or on the container, in one variant of the device said device comprises fastening means for detachably fastening the device onto the container.

The fastening means are embodied in the form of a screw connector, for example, with which the device can be screw-mounted onto the container over the opening thereof.

It is also advantageous for the device to have eyes for fastening the device in the surrounding area and/or on the container. This provides reliable protection against loss and theft.

Finally, for reasons already described above, it is also expedient for the temperature measuring device to be arranged on the device in such a way that when the device is attached to the container, the temperature measuring device projects at least partially into the liquid located inside the container.

Advantageously, the temperature measuring device comprises at least one NTC element (NTC resistor, "negative temperature coefficient"), which is advantageous, sturdy, and easy to use, and with which the temperature can be measured in a known manner by the measurement of resistance.

BRIEF DESCRIPTION OF THE DRAWINGS

In what follows, the invention will be specified in greater detail in reference to the set of drawings. The drawings show FIG. 1 a schematic illustration of a first simple variant of the device according to the invention without temperature measurement, FIG. 2 a schematic illustration of a second variant of the device according to the invention with temperature measurement, FIG. 3a a schematic, perspective illustration of a device of the invention according to FIG. 1, before said device is attached to a container filled with liquid, FIG. 3b a schematic, perspective illustration of a device of the invention according to FIG. 2, before said device is attached to a container filled with liquid, FIG. 4a the correlation between the decrease in the germ count in a liquid as a function of time and at different UV intensities and temperatures, FIG. 4b the behavior of bacteria reduction as a function of time with constant UV intensity and varying temperatures, and FIG. 5a-5c the behavior of the characteristic value $K(t)$ as a function of time for different temperature scenarios.

DETAILED DESCRIPTION OF THE PRESENT INVENTION

Figure 1:
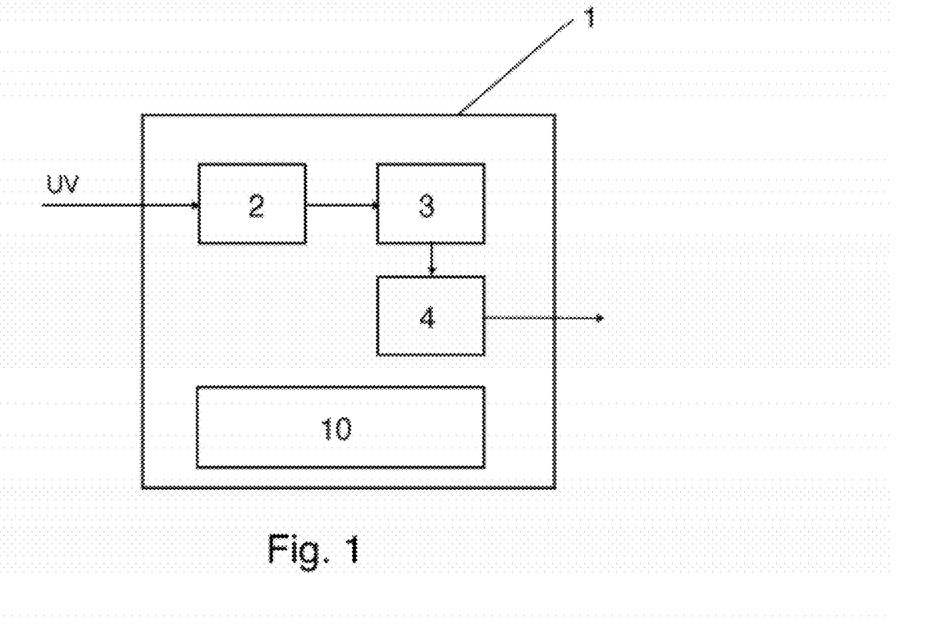

FIG. 1 shows a device 1 for determining the degree of disinfection (or the time at which a defined degree of disinfection is reached) of a liquid, particularly drinking water, which is located inside a container 100 (FIG. 3a) that is transparent to at least one UV region. The container 100 can be a conventional PET bottle, for example.

The device comprises a UV measuring device 2 for measuring the intensity of UV radiation in the region of the container 100 and an analysis unit 3, to which the values for UV intensity measured by the UV measuring device 2 are fed. The analysis unit 3 converts the values for UV intensity, measured at defined times t from the start of a measurement, to a characteristic value K, and compares the characteristic values K calculated at defined times t with a predetermined characteristic value K0, which predetermined characteristic value Ko corresponds to a defined degree of disinfection of the liquid. When the desired degree of disinfection, which corresponds to the characteristic value Ko, is reached, the device 1 emits signals via a signal output device 4, signaling successful disinfection.

The signal output device 4 can have an acoustic nature or an optical nature, e.g., a blinking or illuminating LED, or a display which displays the relevant information. Naturally, a combination of one or more of these display means is also possible.

To supply power to the individual electronic components, a power supply unit 10 is provided, for example, it comprises a battery or a rechargeable battery or one or more solar cells 7 for generating current. A rechargeable battery 10 is preferably charged by the solar cells 7.

To allow the device 1 to be reliably positioned on the container 100, the depicted variant of the device has fastening means 9 for detachably fastening the device on the container 100, wherein these fastening means are embodied, for example, in the form of a screw connector 9 as illustrated, with which the device can be screwed over the opening of the container 100, for example, onto the neck of a bottle.

It is further advantageous for the device to have eyes 11 for fastening the device in the surrounding area and/or on the container. This offers reliable protection against loss and theft.

Figure 3A:
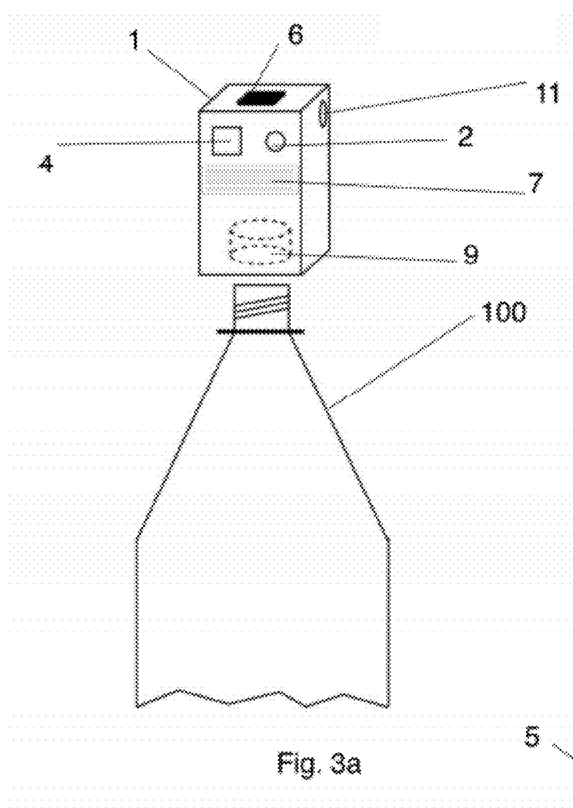

FIG. 3a also shows a key switch 6 for switching the device 1 on and off and/or for starting/stopping a measurement.

Figure 2:
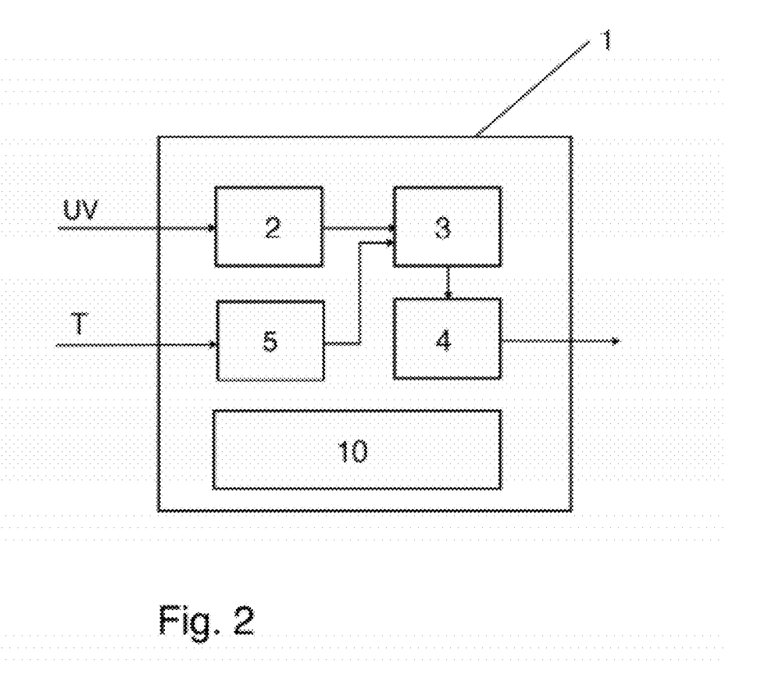
Figure 3B:
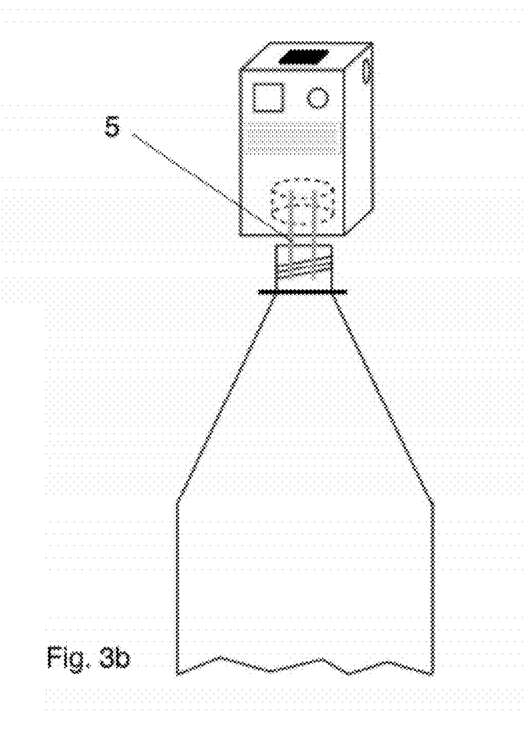

FIG. 2 and FIG. 3b show a further variant of the device 1, the structure of which is essentially identical to that of the device of FIG. 1 and FIG. 3a, and which further comprises a temperature measuring device 5 for determining the temperature T of the liquid inside the container 100.

The determined temperature T of the liquid inside the container 100 can then be taken into consideration in calculating the characteristic value K.

The factor of temperature can be a significant component in accelerating disinfection. At temperatures above 40° C., pathogens are killed off by the temperature alone. Temperature disinfection is independent of UV radiation; however, in combination these offer a guarantee of optimal disinfection.

Figure 4A:
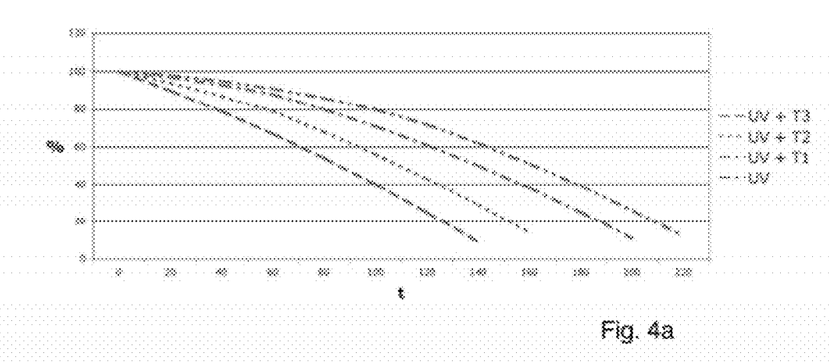
Figure 4B:
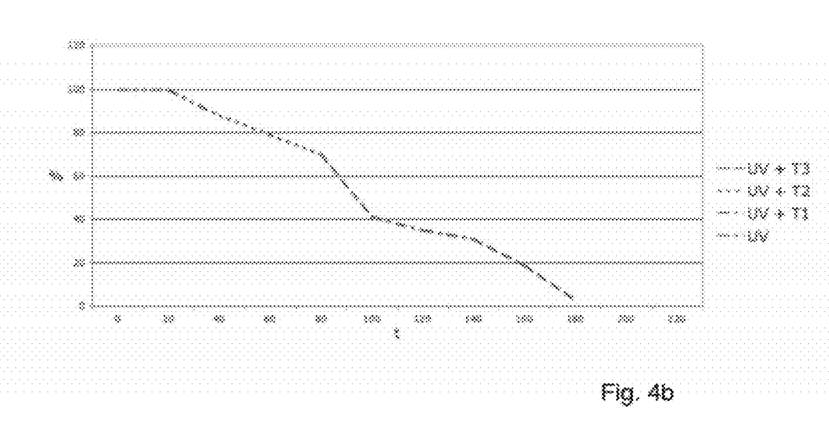

The effect of temperature on bacteria reduction is illustrated in FIG. 4a. The line labeled "UV" shows bacteria reduction as a function of time t, in which a temperature which makes no significant contribution to germ reduction is assumed. The curves labeled "UV+T1", "UV+T2" and "UV+T3" show bacteria reduction as a function of time at the same UV intensity, but with increasing temperature. As is clear, the amount of time required for bacteria reduction is decreased significantly at high temperatures (assumption: T3>45° Celsius) as compared with the other temperatures, and particularly the case without significant temperature (for disinfection).

A sufficient temperature can be reached in a technically simple manner by means of a dark or reflective surface, on which the water-filled PET bottles are placed for disinfection.

Temperature measurement is meaningful and/or expedient only when (sufficient) liquid is present, specifically, at least enough liquid that the temperature measuring device is also in contact with the liquid. It is therefore expedient for the temperature measuring device 5 to be configured for detecting the presence of liquid, and for the temperature to be measured only when liquid is present.

If the temperature measuring device is not in contact with the liquid, the temperature of the air in the container would otherwise be measured, which, in some circumstances, can be substantially higher than the temperature of the liquid. This would lead to a distorted result and particularly to a premature indication of the desired disinfection time.

In one specific embodiment of the invention, it is provided that the UV measuring device 2 comprises at least one UV sensor.

In one variant of the invention, the UV measuring device 2 comprises one or more solar cells. A filter is situated upstream of the solar cell or cells and permits the passage only of light in the UV region, particularly only in the UV-A region or in the preferred measurement spectrum. The UV intensity can then be deduced based upon the current supplied by the solar cells.

The use of solar cells can offer a substantially more advantageous solution than using a separate UV sensor. However, a combination of UV sensor 2 and solar cells 7, as illustrated in FIG. 3a, for the UV measuring device 2 is also conceivable in principle.

To calculate the characteristic value K(t), the values for UV intensity, measured per unit of time ($\Delta t$), are totaled over the time (t) and/or the values for UV intensity, measured as a function of time (t), are integrated over time. In other words, in practical terms, the dose of UV radiation (e.g., in $Ws/m^2$) is calculated as a function of time, and is continuously compared with a threshold value Ko (for the dose), which threshold value defines a degree of disinfection at which the liquid (water) is potable.

Figure 5A:
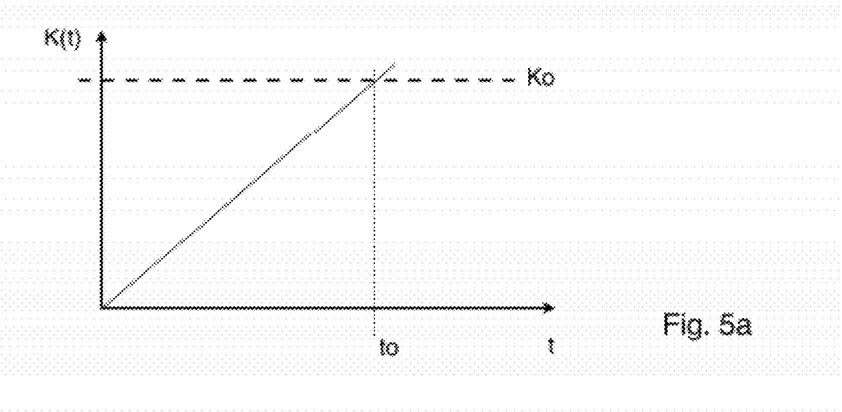

FIG. 5a schematically illustrates a corresponding process, in which a constant UV intensity is assumed, and the influence of temperature is not taken into consideration. After a time t=to, the characteristic value K reaches the value Ko, K(t0)=Ko, which is the time at which the desired degree of disinfection is reached, and the device emits a signal which signals successful disinfection to the user.

To optimize the synergistic effects of UV radiation and the prevailing temperature of the liquid for disinfection and/or for determining the time of a defined degree of disinfection, the values for UV intensity measured per unit of time $\Delta t$ or as a function of time t are preferably weighted, prior to totaling or integration, with the temperature T($\Delta t$) measured per unit of time $\Delta t$ or with the temperature T(t) measured as a function of time t, respectively.

Figure 5B:
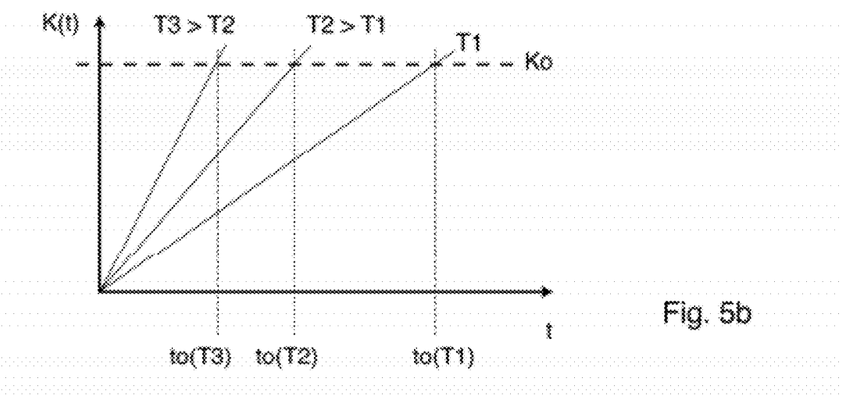

In FIG. 5b, three different measurements at three different temperatures are shown, with T1<T2<T3. As is clear from this figure, as the temperature increases (with UV intensity remaining constant) the curve (straight line) K(t) rises to a steeper slope with a correspondingly greater increase, and the value to for disinfection is reached more quickly at higher temperatures.

In the cases illustrated in FIG. 5b, in which, although the temperature is taken into consideration, the temperature is assumed to remain constant over the entire measurement period, the weighting of the values for UV intensity can also be achieved by replacing the value Ko with a value Ko*, which takes the temperature into consideration. Accordingly, at T3, the value Ko*(T3) would be lower than that for Ko*(T2) or Ko*(T1), for example, and naturally also lower than Ko.

Figure 5C:
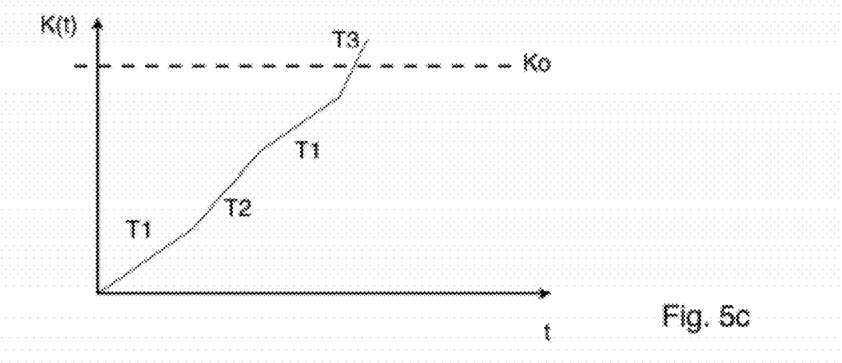

However, in the case of realistic measurements, the temperature varies, as is illustrated in FIG. 5c.

In such cases, the temperature can actually be measured and taken into consideration at every time t or every unit of time $\Delta t$ at which UV intensity is measured. However, the temperature can also be measured at greater time intervals since it generally does not vary as greatly as UV intensity.

In one easily implemented variant of the invention, the analysis unit 3 comprises a counter or is a counter, the counter reading of which increases per unit of time $\Delta t$ by a counter value that is proportional to the value for UV intensity measured in said unit of time $\Delta t$, and the predetermined characteristic value Ko corresponds to a specific value for the counter reading.

If the temperature is taken into consideration in this variant, the counter value is multiplied by a proportionality factor kT that is dependent on the temperature T, which proportionality factor takes on the value of 1 for a minimal temperature Tmin and for temperature values below the minimal temperature Tmin, and takes on a value greater than 1, dependent on the temperature, for temperature values above the minimal temperature Tmin.

In a simple but reliable variant, for example, for T>35° Celsius, kT=1 is used; for the range of 35°-40°, kT=1.1; kT=1.2 for 40°-45°; and for T>45°, kT=1.3.

At this point it is noted, however, that the numerical values and the graphics indicated here are to be regarded merely as examples, and can naturally also be adapted accordingly to the situation or to more recent research findings in the field.

The temperature measuring device 5 is arranged on the device 1 in such a way that when the device 1 is attached to the container 100, the temperature measuring device 5 projects at least partially into the liquid located inside the container 100.

Advantageously, the temperature measuring device 5 comprises at least one NTC element (NTC resistor, "negative temperature coefficient"), which is advantageous, sturdy, and easy to use, and with which the temperature can be measured in a known manner by the measurement of resistance.

The analysis unit 3 comprises a microprocessor and a memory, wherein this memory can be integrated into the processor. When a measurement is restarted, the memory is checked, and if data from a previous measurement are available, the measurement data are read out and are recalculated based upon internal comparison data. If a measurement or a disinfection cycle has been interrupted before the Ko is reached, for example, bacteria can again accumulate in the liquid. Measurement therefore cannot be continued from the last value for K(t), and instead, this accumulation must be taken into consideration accordingly, since the germ count increases again following an extended interruption of the UV radiation, and the previous data must therefore be adapted.

Interruptions in measurement can occur especially when the supply of power is provided exclusively via solar cells without intermediate buffering with a rechargeable battery, for example, with the onset of night.

The device 1 according to the invention therefore continuously abstracts and integrates sensor data about radiation intensity, irradiated UV dose, and temperature, and compares these data with data from scientific studies so as to ensure a suitable reduction in the germ count. The synergistic processes of UV-induced killing and thermal inactivation (dose- and time-dependent) with opposing processes of the repair mechanisms of bacteria are taken into consideration. As a result, even under difficult environmental conditions (low light conditions, clouding, intermittent rain), it is possible to ensure an optimized disinfection time and an adequate reduction in bacteria that can be estimated. Accordingly, the characteristic value Ko can be determined, preferably or for example, from microbiological tests.

In what follows, three series of microbiological tests are represented by way of example, wherein an artificial UV source has been used for solar simulation: The test structure comprises, for one, a radiation unit, measurement by means of a calibrated UV measuring device, and recording by a separate program. At the times indicated in the tables, a sample of the water was taken. In addition, with each test, a blind test was conducted with a bottle prepared in the same manner, which was not exposed to the radiation.

TABLE 1

| Total Minutes | Min. | W/m² | Dose J/m² | Total Dose | KFU/ml (Colony Forming Units) |
|---|---|---|---|---|---|
| 0 | 0 | 0 | 0 | 0 | 900000 |
| 45 | 45 | 8.754 | 23635.80 | 23635.80 | 700000 |
| 90 | 45 | 8.681 | 23438.70 | 47074.50 | 200000 |
| 135 | 45 | 8.511 | 22979.70 | 70054.20 | 20000 |
| 165 | 30 | 8.441 | 15193.80 | 85248.00 | 15000 |
| 195 | 30 | 8.403 | 15125.40 | 100373.40 | 10000 |
| 225 | 30 | 8.341 | 15013.80 | 115387.20 | 2000 |
| 255 | 30 | 8.501 | 15301.80 | 130689.00 | 30 |
| 275 | 20 | 8.539 | 10246.80 | 140935.80 | 15 |
| 290 | 15 | 8.518 | 7666.20 | 148602.00 | 8 |
| 305 | 15 | 8.505 | 7654.50 | 156256.50 | 2 |
| 320 | 15 | 8.417 | 7575.30 | 163831.80 | 0 |
| 330 | 10 | 8.475 | 5085.00 | 168916.80 | 0 |

TABLE 2

| Total Minutes | Min. | W/m² | Dose J/m² | Total Dose | CFU/ml (Colony Forming Units) |
|---|---|---|---|---|---|
| 0 | 0 | 0 | 0 | 0 | 1600000 |
| 60 | 60 | 3.985 | 14346.00 | 14346.00 | 3600000 |
| 105 | 45 | 7.071 | 19091.70 | 33437.70 | 500000 |
| 125 | 20 | 10.501 | 12601.20 | 46038.90 | 22000 |
| 140 | 15 | 16.601 | 14940.90 | 60979.80 | 12000 |
| 155 | 15 | 16.691 | 15021.90 | 76001.70 | 1360 |
| 170 | 15 | 10.681 | 9612.90 | 85614.60 | 50 |
| 180 | 10 | 10.451 | 6270.60 | 91885.20 | 35 |
| 200 | 20 | 6.975 | 8370.00 | 100255.20 | 0 |
| 220 | 20 | 6.453 | 7743.60 | 107998.80 | 0 |

TABLE 3

| Total Minutes | Min. | W/m² | Dose J/m² | Total Dose | CFU/ml (Colony Forming Units) |
|---|---|---|---|---|---|
| 0 | 0 | 0 | 0 | 0 | 1500000 |
| 60 | 60 | 8.549 | 30776.40 | 30776.40 | 800000 |
| 100 | 40 | 13.01 | 31224.00 | 62000.40 | 250000 |
| 125 | 25 | 22.91 | 34365.00 | 96365.40 | 200000 |
| 155 | 20 | 16.26 | 19512.00 | 115877.40 | 242500 |
| 200 | 45 | 5.542 | 14963.40 | 130840.80 | 66000 |
| 230 | 30 | 12.04 | 21672.00 | 152512.80 | 13500 |
| 245 | 15 | 10.15 | 9135.00 | 161647.80 | 1953 |
| 260 | 15 | 10.15 | 9135.00 | 170782.80 | 2315 |
| 270 | 15 | 8.543 | 7688.70 | 178471.50 | 1325 |
| 280 | 10 | 8.481 | 5088.60 | 183560.10 | 816 |
| 295 | 15 | 8.545 | 7690.50 | 191250.60 | 1960 |
| 305 | 10 | 8.501 | 5100.60 | 196351.20 | 780 |
| 315 | 10 | 13.74 | 8244.00 | 173818.80 | 700 |
| 325 | 10 | 13.69 | 8214.00 | 182032.80 | 520 |
| 335 | 10 | 13.78 | 8268.00 | 190300.80 | 210 |
| 345 | 10 | 13.67 | 8202.00 | 167278.80 | 0 |
| 360 | 15 | 13.61 | 12249.00 | 145162.80 | 0 |

The invention claimed is:

1. A method for determining the degree of disinfection or for determining the time at which a defined degree of disinfection of a liquid, particularly drinking water, which is located inside a container that is transparent in at least one UV region, is reached, comprising the following steps:
- measuring the intensity of the UV radiation in the region of the container and determining values for UV intensity,
- weighting the values for UV intensity with one of:
  - a temperature of the liquid measured per unit of time; and
  - the temperature of the liquid measured as a function of time,
- performing one of:
  - totaling the values for UV intensity over time; and
  - integrating the values for UV intensity measured as a function of time,
- using an analysis unit, converting the values for UV intensity, measured at defined points in time from the start of a measurement, to a characteristic value, characterized in that the analysis unit comprises a counter or is a counter, the counter reading of which increases per unit of time by a counter value which is proportional to the value for UV intensity measured in said unit of time, and in that the predetermined characteristic value corresponds to a defined value for the counter reading,
- multiplying the counter value by a proportionality factor that is dependent on the temperature, which proportionality factor takes on the value of 1 for a minimal temperature and for temperature values below the minimal temperature, and takes on a value greater than 1, dependent on the temperature, for temperature values above the minimal temperature,
- comparing the characteristic values calculated at defined points in time with a predetermined characteristic value, which predetermined characteristic value corresponds to a defined degree of disinfection of the liquid, and
- emitting a signal when the calculated characteristic value reaches or exceeds the predetermined characteristic value.

2. The method according to claim 1, characterized in that the temperature of the liquid inside the container is further taken into consideration in the determination of the characteristic value.

3. A method for determining the degree of disinfection or for determining the time at which a defined degree of disinfection of a liquid, particularly drinking water, which is located inside a container that is transparent in at least one UV region, is reached, comprising the following steps:
- measuring the intensity of the UV radiation in the region of the container and determining values for UV intensity,
- performing one of:
  - totaling the values for UV intensity over time; and
  - integrating the values for UV intensity measured as a function of time,
- using an analysis unit, converting the values for UV intensity, measured at defined points in time from the start of a measurement, to a characteristic value, characterized in that the analysis unit comprises a counter or is a counter, the counter reading of which increases per unit of time by a counter value which is proportional to the value for UV intensity measured in said unit of time, and in that the predetermined characteristic value corresponds to a defined value for the counter reading,
- multiplying the counter value by a proportionality factor that is dependent on the temperature, which proportionality factor takes on the value of 1 for a minimal temperature and for temperature values below the minimal temperature, and takes on a value greater than 1, dependent on the temperature, for temperature values above the minimal temperature,
- comparing the characteristic values calculated at defined points in time with a predetermined characteristic value, which predetermined characteristic value corresponds to a defined degree of disinfection of the liquid, and
- emitting a signal when the calculated characteristic value reaches or exceeds the predetermined characteristic value.

4. The method according to claim 3, characterized in that the temperature of the liquid inside the container is further taken into consideration in the determination of the characteristic value.

* * * * *